United States Patent
Takashima et al.

(10) Patent No.: US 6,439,554 B1
(45) Date of Patent: Aug. 27, 2002

(54) SWITCHABLE LIQUID-FILLED VIBRATION ISOLATING MOUNT

(75) Inventors: Yukio Takashima; Masashi Takaoka, both of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/526,409

(22) Filed: Mar. 16, 2000

(30) Foreign Application Priority Data

May 27, 1999 (JP) .......................................... 11-148146

(51) Int. Cl.[7] .............................................. F16F 13/26
(52) U.S. Cl. .................................. 267/140.13; 267/219
(58) Field of Search ................................ 267/219, 220, 267/140.11, 140.13, 140.14

(56) References Cited

U.S. PATENT DOCUMENTS

| | | |
|---|---|---|
| 5,217,211 A | 6/1993 | Ide et al. |
| 5,246,212 A | 9/1993 | Funahashi et al. |
| 5,314,173 A | 5/1994 | Ide et al. |
| 5,344,127 A * | 9/1994 | Hettler et al. ............ 267/140.13 |
| 5,462,261 A * | 10/1995 | Eckel et al. ............. 267/140.13 |
| 5,620,168 A | 4/1997 | Ohtake et al. |
| 5,628,498 A | 5/1997 | Nanno |
| 5,632,472 A | 5/1997 | Kato et al. |
| 5,642,873 A | 7/1997 | Kato |
| 5,769,402 A | 6/1998 | Ide et al. |
| 5,848,782 A | 12/1998 | Hein et al. |
| 5,911,412 A * | 6/1999 | Durand et al. .......... 267/140.13 |
| 6,131,894 A * | 10/2000 | Satori et al. ............ 267/140.13 |
| 6,244,578 B1 * | 6/2001 | Schwerdt ............... 267/140.13 |
| 6,267,362 B1 | 7/2001 | Satori et al. |
| 6,276,672 B1 * | 8/2001 | Rudolf et al. .......... 267/140.13 |

FOREIGN PATENT DOCUMENTS

| | | |
|---|---|---|
| DE | 3933252 | 4/1991 |
| JP | 4-272533 | 9/1992 |
| JP | 8-270718 | 10/1996 |
| JP | 9-196110 * | 7/1997 |
| JP | 9-210118 * | 8/1997 |
| JP | 10-184777 | 7/1998 |
| JP | 10-238586 | 9/1998 |
| JP | 11-230242 * | 8/1999 |

* cited by examiner

Primary Examiner—Paul N. Dickson
Assistant Examiner—Bradley King
(74) Attorney, Agent, or Firm—Jordan and Hamburg LLP (57) ABSTRACT

There is provided a switchable liquid-filled vibration isolating mount that damps each of shaking vibration and idling vibration by opening and closing an orifice, and that maintain a stable and reliable operation for a long period. First and second fixtures are joined together by a vibration isolating base body to form an inner space defined thereby. This inner space is partitioned by a partitioner and first and second diaphragms to form main and sub-liquid chambers that are communicating with each other via inner and outer orifices. A space between the first and second diaphragms is an equilibrium chamber. A space between the second diaphragm and second fixture is a switching chamber into which either of an atmospheric pressure and a reduced pressure is selectively introduced. The inner orifice is an opening of the partitioner. The first diaphragm has in its central portion a valve body that has a projection always inserted in the inner orifice all the time the orifice is opened or occluded.

13 Claims, 4 Drawing Sheets

SWITCHABLE LIQUID-FILLED VIBRATION ISOLATING MOUNT

BACKGROUND OF THE INVENTION

This invention-relates to a switchable liquid-filled vibration isolating mount used to support in a vibration isolating or damping manner a vibrator, such as a power unit and the like of an automobile.

A liquid-filled vibration isolating mount has heretofore been used as a mount for supporting a vibrator, such as an automobile engine so that vibration is not transmitted to a car body.

As a kind of such mount, it has been proposed a switchable liquid-filled vibration isolating mount in which their vibration isolating or damping characteristics are switched from one to another, in accordance with each of two kinds of vibrations in different frequency ranges including shaking vibration and idling vibration (for example, JP-A-1996-270718, JP-A-1998-238586 and JP-A-1998-184777 (Japanese Patent Laid-Open or Unexamined Publication Nos. 270718/1996, 238586/1998 and 184777/1998)).

Figure 5:
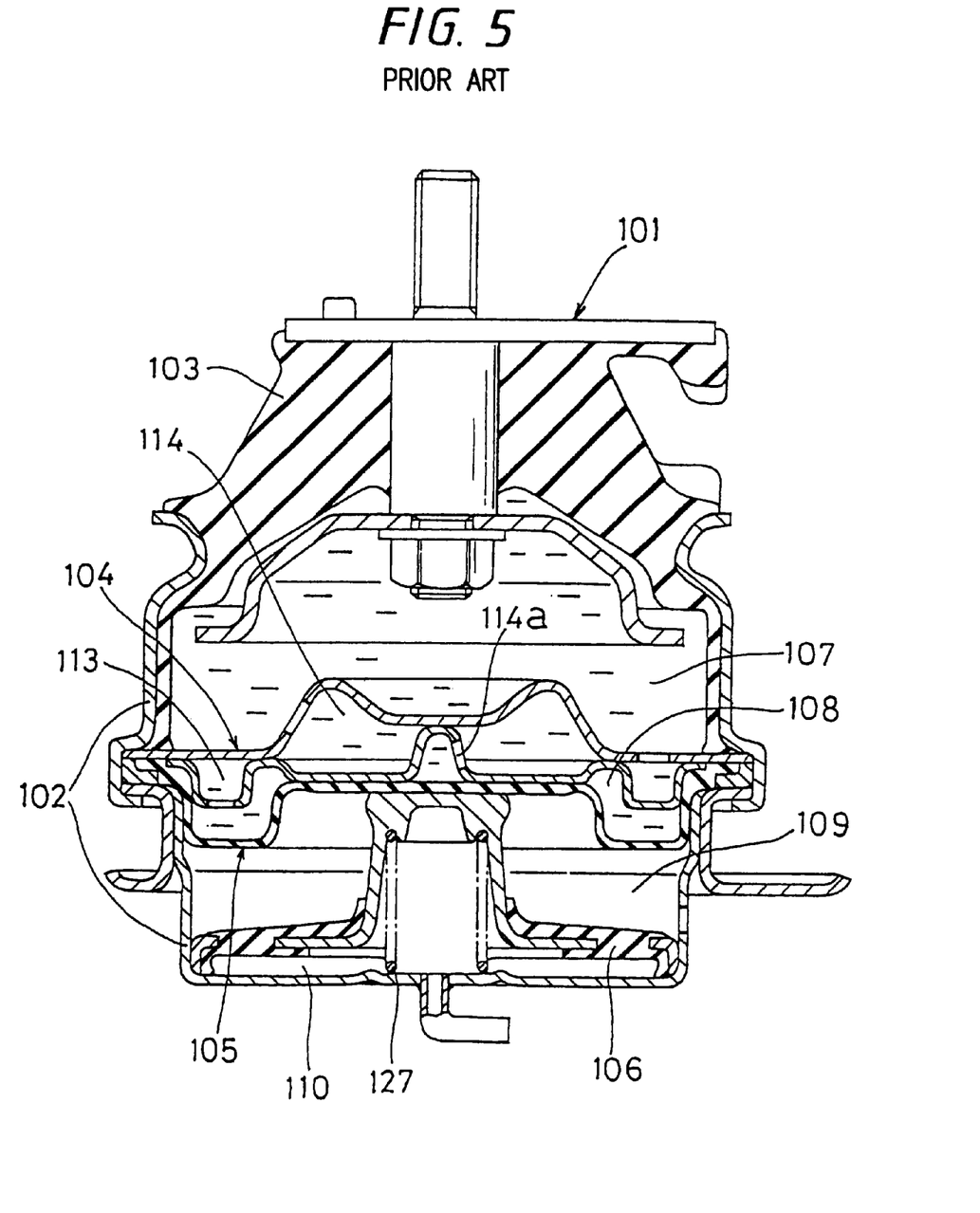
FIG. 5 is a longitudinal sectional view of a switchable liquid-filled vibration isolating mount of related art in a state where an atmospheric pressure is introduced into a switching chamber.

For example, JP-A-1996-270718, discloses a mount shown in FIG. 5 herein which has the following construction.

This vibration isolating mounts includes a first rigid fixture 101; a second rigid fixture 102 having a bottomed barrel shape, a bottom wall of which is spaced apart from the first fixture 101 at a predetermined distance away in the axial direction; a vibration isolating base body 103 interposed between and joining together the first and second fixtures 101, 102, and formed of an elastic material such as rubber; a partitioner 104 and first and second diaphragms 105, 106 disposed in series in the axial direction between the vibration isolating base body 103 and second fixture 102; a main liquid chamber 107 formed between the vibration isolating base body 103 and partitioner 104; a sub-liquid chamber 108 formed between the partitioner 104 and first diaphragm 105; an outer orifice 113, and an inner orifice 114 positioned diametrically on the inner side of the outer orifice 113 both of which orifices are provided on the partitioner 104 and communicate the main and sub-liquid chambers 107, 108 with each other, which outer orifice 113 extends to a predetermined length in the circumferential direction of the partitioner 104, which inner orifice 114 is adapted to be opened and occluded by and with the first diaphragm 105; a biasing member 127 adapted to bias or elastically press the first diaphragm 105 against the partitioner 104 to thereby prevent a liquid from flowing between the inner orifice 114 and sub-liquid chamber 108; an equilibrium chamber 109 formed between the first and second diaphragms 105, 106; and a switching chamber 110 formed between the second diaphragm 106 and second fixture 102 and capable of receiving an atmospheric pressure and a reduced pressure introduced selectively thereinto, the introduction of a reduced pressure into the switching chamber 110 causing the first diaphragm 105 to be moved against a biasing force of the biasing member 127 and leave the partitioner 104, and the inner orifice 114 and sub-liquid chamber 108 to communicate with each other, whereby the orifices corresponding to the respective two kinds of vibrations in different frequency ranges can be selectively used.

In this known liquid-filled vibration isolating mount, not only the outer orifice 113 but also the inner orifice 114 opened and occluded by and with the first diaphragm 105 are annularly formed. Because the inner orifice 114 also has some significant length in circumferential direction, a resulted flow resistance suppresses the liquid flow therein. Consequently, because the liquid also flows in the outer orifice 113, a sufficient vibration damping effect cannot be obtained in the inner orifice 114.

In order to occlude the inner orifice 114, a central portion of the first diaphragm 105 is pressed against a lower face of the partitioner 104 by the biasing member 127. In detail, the planar central portion of the first diaphragm 105 abuts on the planar portion of the partitioner 104, which planar portion is around an opening 114a of the inner orifice 114 and which planar portion is on the side of the sub-liquid chamber 108. The inner orifice 114 is occluded only by such a plane-to-plane abutting. Therefore, when a pressure of, for example, the interior of the main liquid chamber 107 becomes suddenly high, or when a slight loosening occurs in the engaged portion due to a lateral deviation of the first diaphragm 105, there is the possibility that the inner orifice 114 is not sufficiently occluded.

BRIEF SUMMARY OF THE INVENTION

The present invention has been made in view of the above-described problems. The present invention provides a switchable liquid-filled vibration isolating mount having basically the same construction as the above-described known liquid-filled vibration isolating mount which has inner and outer orifices, the inner orifice out of which is formed so that it can be opened and closed, and which is capable of selectively using the orifices corresponding to two kinds of vibrations in different frequency ranges, such as shaking vibration and idling vibration, the apparatus according to the invention being formed so that it can solve the aforementioned problems and retain stable characteristics thereof by improving the modes of the two orifices on the partitioner and the shape of the inner orifice-occluding first diaphragm.

The present invention is directed to a switchable liquid-filled vibration isolating mount including, just as the above-described liquid-sealed vibration isolating mount, a first fixture; a second bottomed cylindrical fixture; a vibration isolating base body joining these fixtures together; a partitioner and first and second diaphragms disposed in series between the second fixture and vibration isolating base body; main and sub-liquid chambers separated from each other by the partitioner; outer and inner orifices provided in the partitioner and communicating the two chambers with each other; a biasing member for pressing the first diaphragm against the partitioner; an equilibrium chamber formed between the first and second diaphragms; and a switching chamber formed between the second diaphragm and second fixture; the partitioner between the main and sub-liquid chambers having an opening as the inner orifice extending therethrough in the axial direction; the first diaphragm being provided with a valve body having a projection coaxial with and adapted to be fitted in the opening as the inner orifice; the switching chamber being formed so that either a reduced pressure or an atmospheric pressure is introduced thereinto to cause the valve body to be vertically moved and thereby enable the opening to be occluded or opened.

When the valve body moves away from the partitioner to cause the opening to be opened, the inner orifice is put in an operating state, so that a vibration damping operation in a frequency range set with respect to the inner orifice is carried out effectively with a liquid flow in the outer orifice suppressed.

Meanwhile, because the projection of the valve body is inserted in the opening, the occurrence of loosening of the occlusion due to a lateral deviation of the first diaphragm is prevented, so that the first diaphragm can tightly abuts at all times on the partitioner without being laterally displaced with respect to the latter. Accordingly, a sufficient occluded condition can be secured, whereby stable characteristics of the apparatus can be maintained for a long period.

The circumferentially extending outer orifice may extends along a circular, elliptic or polygonal shape, or some other complete annular shape; or a shape of a part of any of these shapes.

In this vibration isolating mount, the outer orifice may be formed as a shaking vibration damping member, and the inner orifice as an idling vibration damping member.

A flow passage of the outer orifice is formed to a length larger than that of a flow passage of the inner orifice, and/or a cross-sectional area in the axial direction of the vibration isolating mount of the former flow passage can be set smaller. Since the outer orifice is thus formed, the outer orifice can be used more suitably for damping vibration of a smaller frequency and a larger wavelength as compared with the inner orifice.

It is preferable from the viewpoint of the manufacturing of this mount to provide the inner orifice in a central portion of the partitioner, and the valve body in a central portion of the first diaphragm correspondingly.

When the projection of the valve body in this switchable liquid-filled vibration isolating mount is provided so that at least a part of this portion is positioned in the opening of the partitioner even during the introduction of a reduced pressure into the switching chamber, there is not the possibility that the valve body completely leaves the opening. Therefore, the displacement preventing effect is reliably obtained. In addition, when a lateral deviation preventing unit is provided on an outer circumferential part of the projection of the valve body, the valve body abuts on a lower face of the partitioner without being laterally deviated, so that the abutting of the valve body occluding the inner orifice is not loosened. When this lateral deviation preventing unit is engaged with the inner orifice, the lateral deviation preventing effect is obtained more reliably.

In this switchable liquid-filled vibration isolating mount, a cap-like member joined to the second diaphragm and defining an inner boundary of the equilibrium chamber is suitably formed of a member fitted firmly in a lower portion of the valve body. Owing to such a cap-like member, the valve body is supported so as to maintain a predetermined shape thereof, and moved vertically in accordance with the switching of the introduction of a reduced pressure into the switching chamber to that of an atmospheric pressure thereinto, and vice versa, whereby the. opening and closing of the above-mentioned opening is effected reliably.

By use of a stopper member for restricting a downward movement of the valve body during the introduction of a reduced pressure into the switching chamber, a cross-sectional area of an opening formed between the second orifice and valve body is always kept constant at the time of introduction of a reduced pressure into the switching chamber. Thus, the vibration damping characteristics of the mount is kept stable.

DETAILED DESCRIPTION OF THE INVENTION

One preferred embodiment of the switchable liquid-filled vibration isolating mount according to the present invention will now be described with reference to the drawings but the invention is not limited to this embodiment.

Figure 1:
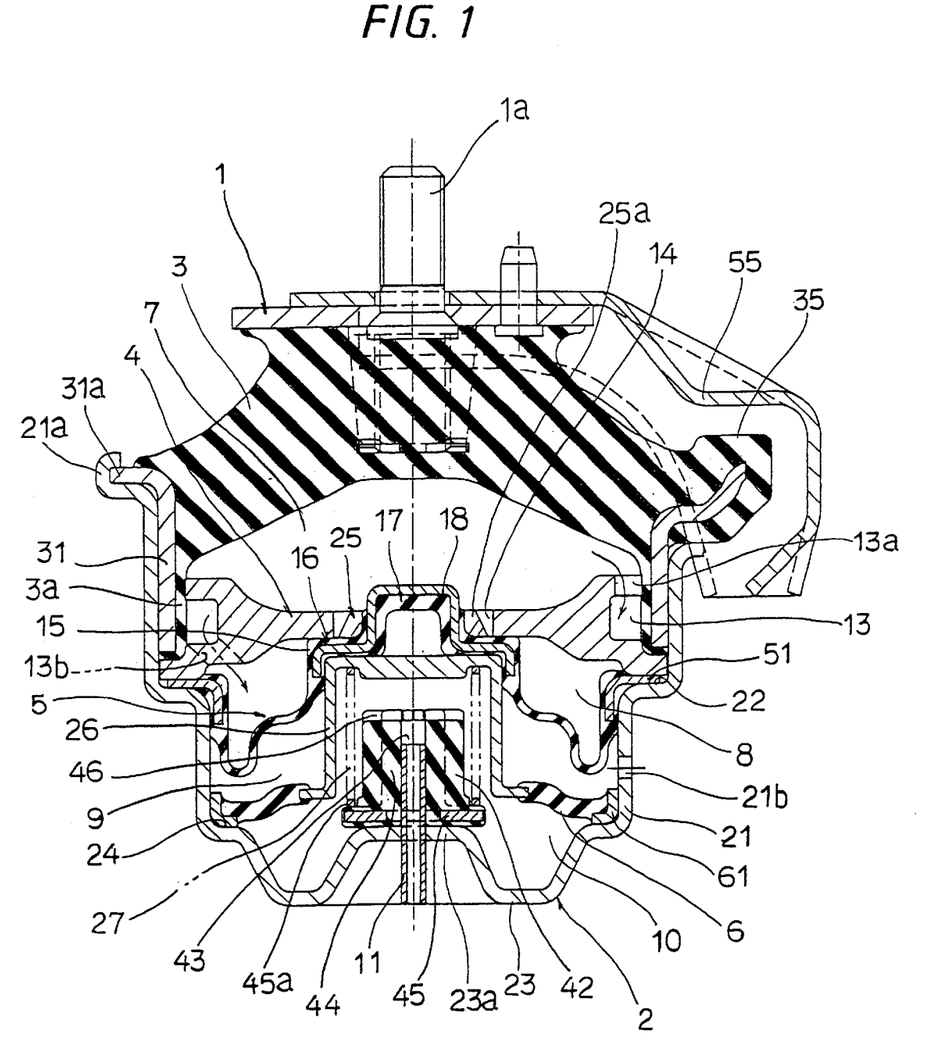
FIG. 1 is a longitudinal sectional view of an embodiment of the switchable liquid-filled vibration isolating mount according to the present invention in a state where an atmospheric pressure is introduced into a switching chamber.
Figure 2:
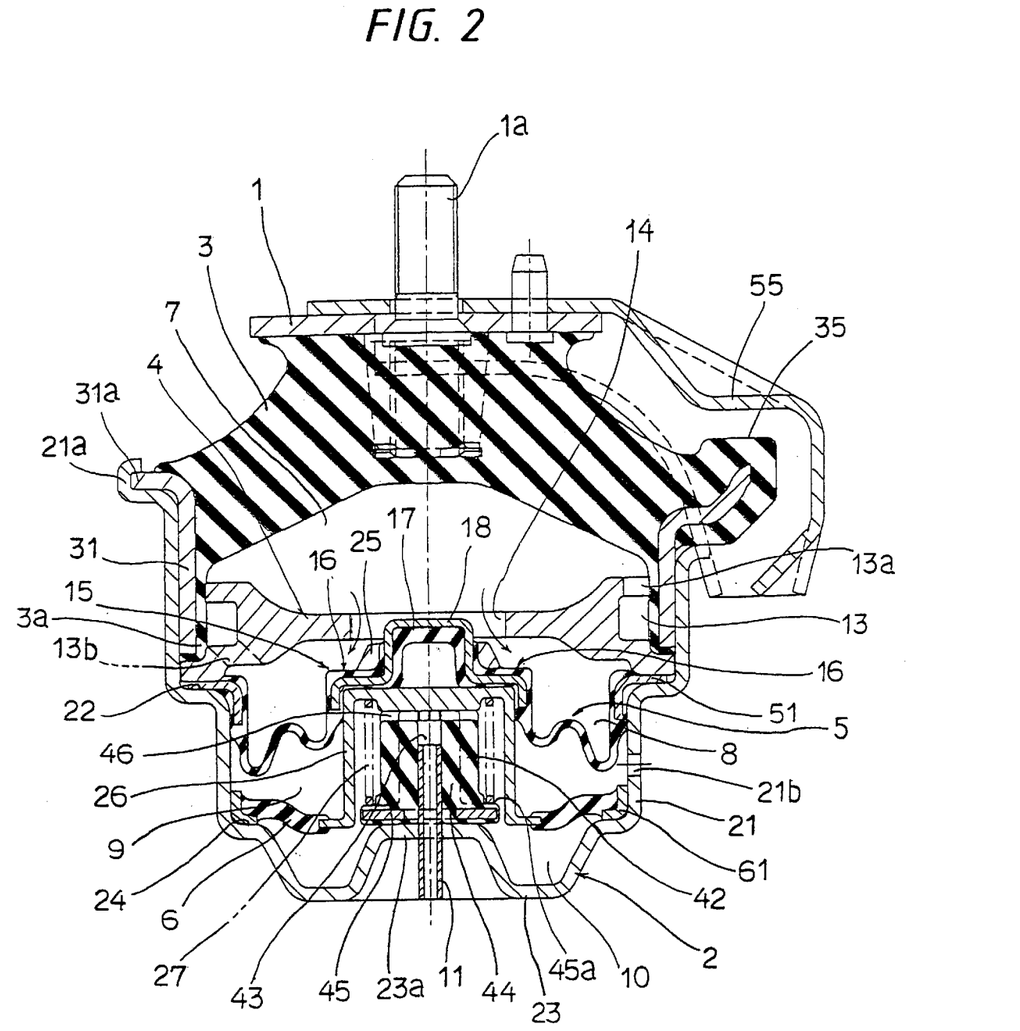
FIG. 2 is a longitudinal sectional view of the same vibration isolating mount in a state where a reduced pressure is introduced into a switching chamber.

As shown in FIGS. 1 and 2, this switchable liquid-filled vibration isolating mount has a first fixture 1, and a cup-shaped or bottomed-barrel-shaped second fixture 2 the bottom portion of which is spaced apart in the axial direction away from the first fixture at a predetermined distance. A thick vibration isolating base body 3 formed of elastic material such as rubber is interposed between these first and second fixtures 1, 2, to connect these first and second fixtures 1, 2.

Both of the first and second fixtures 1, 2 are formed of a rigid material such as a metal. The upper first fixture 1 is formed substantially in the shape of a disc, and provided at its central portion with a fixing bolt 1a in an upwardly projecting state. By this fixing bolt 1a, the first fixture 1 is secured to a power unit, i.e. a vibrator of mainly an automobile engine. The lower second fixture 2 is secured mainly to a car body via a bracket (not shown) additionally provided on an outer circumference of a cylindrical barrel portion 21.

The vibration isolating base body 3 has an umbrella-like bowed shape as shown in the drawings, and the first fixture 1 is joined to an upper portion of this vibration isolating base body 3 by a vulcanization bonding. A cylindrical or barrel-shaped reinforcing metal member 31 is bonded by vulcanization onto an outer circumference of a lower portion of the vibration isolating base body 3. The reinforcing metal member 31 is fitted firmly in an inner circumference of an upper part of the barrel portion 21 of the second fixture 2.

In case of the illustrated embodiment, the barrel portion 21 of the second fixture 2 has a large diameter at an upper opening side part thereof, and a slightly smaller diameter at a lower part thereof. The barrel portion 21 has a stepped portion 22 at an intermediate part thereof, and a stepped portion 24 at the part thereof which is in the vicinity of a bottom wall 23. An opening edge part 21a of the barrel portion 21 is fixed by calking to a flange 31a at an upper end of the reinforcing metal member 31 that is fitted firmly in the upper inner circumference of the barrel portion 21.

In a hollow space between the vibration isolating base body 3 and second fixture 2, a partitioner 4, and first and second diaphragms 5, 6 formed of a rubber film are arranged in the mentioned order in series in the axial direction from the side of the vibration isolating base body 3. A space between the vibration isolating base body 3 and partitioner 4 is filled with a liquid and serves as a main liquid chamber 7. A space between the partitioner 4 and first diaphragm 5 serves as a sub-liquid chamber 8 communicating with the main liquid chamber 7 via orifices which will be described later.

A space between the first and second diaphragms 5, 6 serves as an equilibrium chamber 9 opened into the atmosphere through a vent hole 21b provided in the barrel portion 21 of the second fixture 2. A space between the second diaphragm 6 and a bottom wall 23 of the second fixture 2 serves as a switching chamber 10 into which an atmospheric pressure and a reduced pressure can be introduced selectively as will be described later. Volume of this switching chamber 10 is varied by switching an atmospheric pressure introducing condition and a reduced pressure introducing condition from one to the other. By operating an external change-over valve, (not shown) the atmospheric or reduced pressure is introduced through a switching communication pipe 11 provided through the bottom wall 23. The equilibrium chamber 9 serves as a buffer for buffering a pressure difference between the sub-liquid chamber 8 and switching chamber 10. This buffering action contributes to the durability of the thin diaphragms 5, 6. Such a pressure difference can be controlled by introducing a slightly reduced pressure into the switching chamber 10. The equilibrium chamber 9 may be formed as an air-tightly sealed or enclosed chamber.

Figure 3:
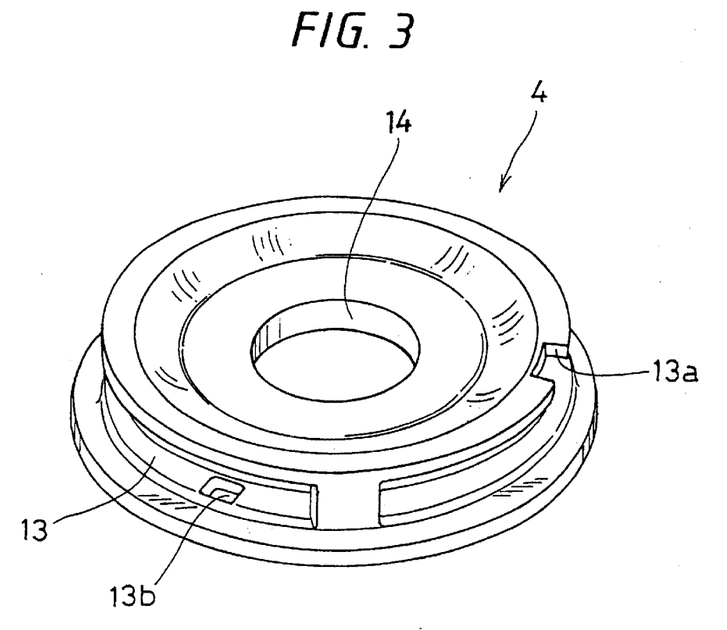
FIG. 3 is a perspective view of a partitioner.

The partitioner 4 is formed of a metal, or other rigid material such as a ceramic and a synthetic resin, and has as shown in FIG. 3 in its outer circumferential portion a groove extending over the whole circumference thereof, so as to form an outer orifice 13. The partitioner 4 also has an opening as an inner orifice 14 in a central portion thereof. The partitioner 4 is fitted air-tightly in an inner face of the reinforcing metal member 31 on its lower-opening side via a seal rubber 3a integral with the vibration isolating base body 3. Thus, the above-mentioned groove extends in a circumferential direction along a circular shape in plan view, as shown in the drawing, to form a passage as the outer orifice 13. This groove may extend along an elliptic shape or a polygonal shape or some other annular shape in plan view. This annular shape may extend either over substantially the whole circumference of the partitioner or over a part, such as a half of the circumference thereof. This outer orifice 13 communicates with the main and sub-liquid chambers 7, 8 through communication ports 13a, 13b respectively which are provided in upper and lower walls of the mentioned groove.

In case of the illustrated embodiment, a lower end of circumferential portion of the partitioner 4 and an annular metal collar 51 are held and retained between the reinforcing metal member 31 and stepped portion 22. The annular metal collar 51 is fitted in an inner face of an upper part of the barrel portion 21 of the second fixture 2 and bonded by vulcanization to an outer circumferential portion of the first diaphragm 5. The annular metal collar 51 is also air-tightly fitted into the part of the barrel portion 21 at just underneath of the stepped portion 22, via a seal rubber portion integral with a rubber film portion of the first diaphragm 5. The second diaphragm 6 is supported by the second fixture 2 in following manner. A metal collar 61 is bonded by vulcanization onto an outer circumferential portion of the first diaphragm 5, and is press fitted into the barrel portion 21 until reaching a position of a lower stepped portion 24 of the barrel portion 21. An outer circumferential part of the metal collar 61 may be upwardly extended in barrel form so as to engage with the stepped portion 22, together with the metal collar 51.

The inner orifice 14 formed as the opening in the central portion of the partitioner 4 communicates with both the main liquid chamber 7 and sub-liquid chamber 8, and is constructed so as to be opened and occluded by a valve body 15 provided especially on a central portion of the first diaphragms.

The valve body 15 is coaxial with the inner orifice 14 formed as the above-mentioned opening, and is capable of closing the inner orifice 14. The valve body 15 is formed integrally with the central portion of the first diaphragm 5. As shown in the drawings, the valve body 15 has a planar face 16 of rubber abutting with a lower face of a periphery of the inner orifice 14, that is the opening of the partitioner 4. The valve body 15 has a projection 17 of as lightly smaller diameter at a center of the planar face 16 of rubber, which projection 17 is inserted in the inner orifice 14. Thus, the valve body 15 has substantially "a reversed bold T shape" in longitudinal cross section of the vibration isolating mount. While the projection 17 being inserted in the inner orifice 14, the valve body 15 is moved vertically to open or occlude the inner orifice 14.

The projection 17 is provided so that at least a part thereof, for example, an upper surface portion thereof is positioned within the inner orifice 14 of the partitioner 4 even in the condition in which a reduced pressure is introduced into the switching chamber 10. Thus, the displacement of the valve body 15 with respect to the inner orifice 14 is prevented.

Usually, the cross-sectional area and length of the outer orifice 13 are designed to exhibit an effective damping of vibrations in a frequency range of "shaking", while the cross-sectional area and length of the inner orifice 14 are designed to exhibit an effective damping of vibrations in a frequency range of "idling". Thus, the outer orifice 13 has a longer flow passage and/or a smaller cross-sectional area in the axial cross sectional view of the vibration isolating mount, as compared with the inner orifice 14. In case of the illustrated embodiment, the outer orifice 13 has a longer flow passage as well as smaller cross-sectional area as compared with the inner orifice 14.

Figure 4:
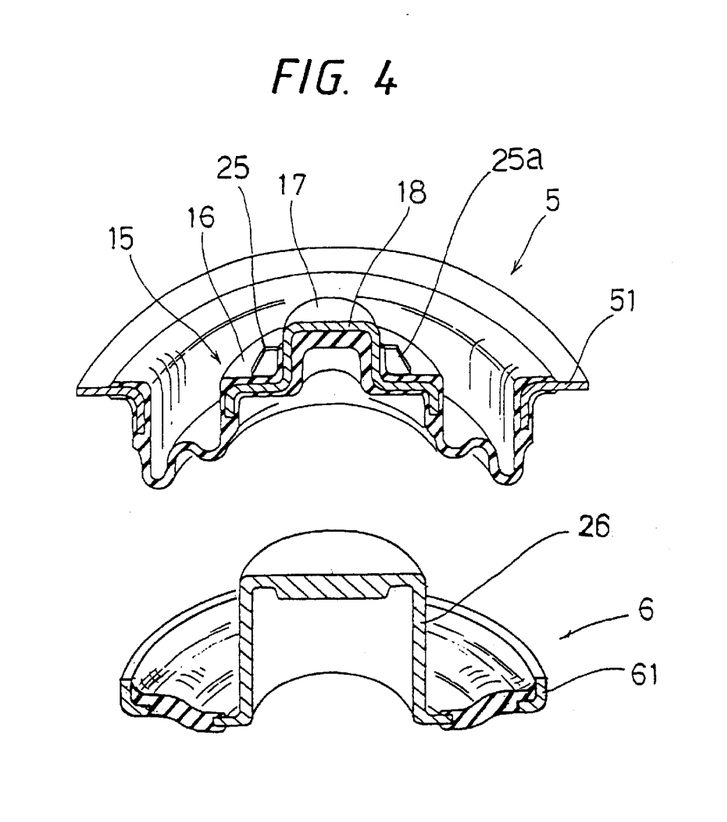
FIG. 4 is a sectioned perspective view of a half of each of first and second diaphragms in a separated state.

The valve body 15 is formed of a reinforcing metal member 18, and rubber layers integrally vulcanized and boded with the reinforcing metal member 18. The reinforcing metal member 18 has "a reversed bold T shape", that substantially corresponds to a shape of the planar face 16 and the projection 17. Thus, the planar face 16 formed on outer portion of the reinforcing metal member 18 abuts on the partitioner 4 in a very stable manner.

Inclined ribs 25a are disposed on periphery of the projection 17 at required intervals in the circumferential direction. For example, four inclined ribs 25a are respectively disposed on front, rear, left and right of the projection 17. The inclined ribs 25a are integrally formed with the rubber layer and serves as a lateral deviation-preventing unit 25 for the valve body 15 by guiding the valve body 15 with respect to the inner orifice 14. Because the inclined ribs 25a are engaged with an inner face of the inner orifice 14, the planar face 16 of the valve body 15 abuts without being laterally displaced, on the lower face of the periphery of the inner orifice 14, which is the opening of the partitioner 4.

The lateral deviation-preventing unit 25 is not limited to the illustrated inclined ribs 25a. Practically workable variations of the units performing the same guiding action as mentioned above include a unit which has a tapering at a circumferential face of the projection 17 and has notches for communication (not shown) on the circumferential face at a required interval, and the like.

Onto an inner side of the reinforcing metal member 18 on lower side of the valve body 15, a cap-shaped member 26 having an inverted U-shaped cross section is fitted firmly by a press fitting unit. The cap-shaped member 26 is bonded by vulcanization to the inner edges of the second diaphragm 6.

Thus, the cap-shaped member 26 defines an inner boundary of the equilibrium chamber 9 between the first and second diaphragms 5, 6. Further, the cap-shaped member 26 also supports the valve body 15 and second diaphragm 6 so as to maintain a constant distance therebetween. The inner side of the cap-like member 26 constitutes a part of the switching chamber 9.

On the inner side of the cap-like member 26, a biasing member or elastically-pressing member such as a member formed of spring is provided for elastically pressing the valve body 15 disposed in the central portion of the first diaphragm 5, to the side of the partitioner 4 via the cap-like member 26. Owing to this arrangement, the valve body 15 is pressed against the partitioner 4 by a biasing force of the biasing member 27 during the introduction of an atmospheric pressure into the switching chamber 10, so that a flow of a liquid in the inner orifice is stopped. During the introduction of a reduced pressure into the switching chamber 10, the valve body 15 moves down against the biasing force of the biasing member 27 away from the partitioner 4 to cause the inner orifice 14 to be opened, so that the main and sub-liquid chambers 7, 8 to communicate with each other.

A position until which the valve body 15 moves down is determined by the reduced pressure in the switching chamber 10 at the time of introduction of a reduced pressure thereinto and by a spring constant of the biasing member 27. Therefore, the biasing member 27 in use usually has such a spring constant that, at the time of the introduction of a reduced pressure into the switching chamber 10, the biasing member 27 is compressed (flexed) together with the valve body 15 toward the bottom wall 23 while accurately confining the first diaphragm 5.

Although the biasing member 27 may also be provided on the bottom wall 23 of the second fixture 2, the biasing unit in the illustrated embodiment is supported via a stopper 42 provided on a central portion 23a of the bottom wall 23, which central portion projects inwardly in a shape of truncated cone.

The stopper 42 is provided so as to prevent via the cap-like member 26 the valve body 15 from moving down by a distance of not shorter than a predetermined level at the time of introduction of a reduced pressure into the switching chamber 10, and maintain a distance between the valve body 15 and partitioner 4 at a constant level. The stopper 42 includes a stopper rubber member 44 having an inner hole 43, and an annular disc plate 45 buried in a lower end portion of the stopper rubber member 44, and the inner hole 43 holds the switching communication pipe 11 provided through the central portion 23a, whereby the stopper is retained in a predetermined position. An outer circumferential edge of the annular disc plate 45 projects outward from the stopper rubber member 44 so as to form a flange, and a spring constituting the biasing member 27 is positioned and supported on this outwardly projected edge 45a. The stopper rubber member 44 is provided in its upper surface portion with a hammering and sticking preventing slits 46.

Since the height and rubber hardness of the stopper rubber member 44 can be set arbitrarily, a distance by which the valve body 15 is moved vertically can be set accurately, and, moreover, the durability of the second diaphragm 6 can be improved.

In case shown in the drawings, the first and second diaphragms 5, 6 are molded separately to be assembled later while such diaphragm 5 or 6 is integrally molded with the metal collars 51 or 61 and valve body 15 or cap-like member 26 using a vulcanization-bonding. However, the two diaphragms 5, 6 may be simultaneously molded by one vulcanization process. When the two diaphragms are molded separately as mentioned above, the second diaphragm 6 and stopper 42 may also be simultaneously molded in to one integral body.

A stabilizer 55 is fixed to the first fixture 1. The stabilizer 55 engages a stopper portion 35 projecting from the vibration isolating base body 3 to restrain a large relative displacement between the first and second fixtures 1, 2.

In the switchable liquid-filled vibration isolating mount formed as described above, the vibration isolating base body 3 is deformed due to vibration exerted thereon by a vibrator, such as a power unit. Then, this deformation causes the liquid in the main liquid chamber 7 to flow into the sub-liquid chamber 8 and back to the main liquid chamber 7 via the outer orifice 13 in the partitioner 4, or the inner orifice 14 formed of an opening. In this vibration isolating mount, the vibration is damped greatly owing to the resonance characteristics of the outer orifice 13 and inner orifice 14 respectively.

FIG. 1 shows the state in which an atmospheric pressure is introduced into the switching chamber 10 through the switching communication pipe 11. In this state, the valve body 15 provided on the central portion of the first diaphragm 5 is biased or elastically pressed to the side of the partitioner 4 by the biasing force of the biasing member 27. In this way, the projection 17 of the valve body 15 is fitted in the inner orifice 14 as an opening while the planar rubber surface 16 abuts the lower surface of the circumferential edge portion of the opening of the partitioner 4. Thus, the inner orifice 14 is occluded, so that the liquid does not flow through the inner orifice 14. Consequently, the liquid flows to and from the main and sub-liquid chambers 7, 8 through the annular outer orifice 13. These flows in outer orifice 13 effectively damps the vibration in an adequate frequency range such as a shaking vibration, for which frequency range the outer orifice 13 is adapted.

FIG. 2 shows the state in which a reduced pressure is introduced into the switching chamber 10 so that the vibration isolating mount can damp idling vibration. By the reduced pressure introduced in the switching chamber 10, the second diaphragm 6 and cap-like member 26 integrally formed therewith are sucked toward the bottom wall 23 of the second fixture 2. At this occasion, the valve body 15 is also moved down against the biasing force of the biasing member 27. The valve body thus moves away from the lower surface of the partitioner 4 to leave a space between the valve body 15 and partitioner 4. Therefore, the inner orifice 14 is opened to the sub-liquid chamber 8, so that the main and sub-liquid chambers 7, 8 communicate with each other.

At this state, the liquid flows through the inner orifice 14 without flowing through the outer orifice 13 since the inner orifice 14 has a large cross-sectional area and a short distance of liquid flow as compared with the outer orifice 13. These flows in inner orifice 14 effectively damps the vibration in an adequate frequency range such as an idling vibration, for which frequency range the inner orifice 14 is adapted. Especially, this vibration isolating mount has one comparatively large opening as the inner orifice 14, as well as the valve body 15 to open and occlude the opening. Therefore, contrary to the annular orifice appeared in similar mounts of the prior art which orifice has some significant length, the inner orifice in invention-wise mount is able to be designed to have an overwhelmingly larger cross-sectional area and an overwhelmingly shorter length of liquid flow, so that the damping of the vibration is facilitated.

Moreover, the projection 17 of the valve body 15 is inserted in the inner orifice 14. Accordingly, even when an atmospheric air is then introduced into the switching chamber to engage the valve body 15 with the partitioner 4, the lateral deviation of the first diaphragm 5 does not occur. Thus, the valve body is brought into tight contact with the partitioner 4 in a uniform manner without causing any loosening of tightly closed contact area ascribed to the lateral deviation of the first diaphragm 5, so that a sufficient occlusion of the inner orifice is secured.

As described above, the switchable liquid-filled vibration isolating mount according to the present invention has a construction in which the inner orifice out of the inner and outer orifices is formed so that it can be opened and closed, whereby an orifice corresponding to one of shaking vibration and idling vibration can be used selectively. In this construction, the inner orifice is formed as an opening of the partitioner, and is opened and closed by the valve body having a projection inserted in that opening as the inner orifice, so that the inner orifice can be opened and closed with the projection left inserted therein. This enables the stable and reliable operation of the vibration isolating mount lasting for a long period.

What is claimed is:

1. A switchable liquid-filled vibration isolating mount for isolating vibration between a first by and a second body in at least an axial direction thereof, comprising:

a first rigid fixture for attachment to said first body;

a second rigid fixture defining a barrel cavity and having a bottom wall spaced apart in said axial direction from said first rigid fixture, said second fixture being for attachment to said second body;

a vibration isolating base body formed of an elastic material interposed between and connecting said first and second rigid fixtures;

a partitioner disposed in said second rigid fixture having a first side opposing said vibration isolating body and defining a main liquid chamber therebetween and a second side opposite said first side;

a first diaphragm disposed in said second rigid fixture opposing said second side of said partitioner and defining a sub-liquid chamber therebetween;

a second diaphragm in said second rigid fixture between said first diaphragm and said bottom wall and defining an equilibrium chamber between said first diaphragm and said second diaphragm and defining a switching chamber between said second diaphragm and said bottom wall;

said partitioner defining an outer orifice and an inner orifice for communicating said main liquid chamber and said sub-liquid cab with each other, said outer orifice extending a predetermined length in a circumferential direction of said partitioner, and said inner orifice being positioned radially inward of said outer orifice and being occludable by movement of said first diaphragm;

a biasing member biasing said first diaphragm against said partitioner to occlude said inner orifice and to thereby prevent a liquid flow between said inner orifice and said sub-liquid chamber via said inner orifice;

said switching chamber including a communication passage for selective application of an atmospheric pressure and a reduced pressure, reduced from said atmospheric pressure, to move said first diaphragm to a first position away from said partitioner against a biasing force of said biasing member to open said inner orifice such that said inner orifice communicates said main liquid chamber with said sub-liquid chamber when said reduced pressure is applied, and to move said first diaphragm to a second position to close said inner orifice such that said inner orifice does not communicate said main liquid chamber with said sub-liquid chamber when said amospheric pressure is applied;

said inner orifice being formed as an opening in a central portion of said partitioner extending through said partitioner in said axial direction;

said first diaphragm including a valve body coaxial with said inner orifice for closing said inner orifice, said valve body having a projection fitting in said inner orifice, wherein switching between said reduced pressure and said atmospheric pressure for said switching chamber moves said valve body to occlude or open said inner orifice; and said valve body having lateral deviation-preventing structure on an outer circumference of said projection, said lateral deviation-preventing structure including a plurality of parts provided at intervals in a circumferential direction of said projection and being engageable with a periphery of said inner orifice.

2. A switchable liquid-filled vibration isolating mount for isolating vibration between a first body and a second body in at least an axial direction thereof, comprising:

a vibration isolating base body formed of an elastic material having a first end connectable to the first body and an opposing second end;

a rigid housing defining a barrel cavity and an open end connected to and sealed by said vibration isolating base body, said rigid housing having a bottom wall spaced apart in said axial direction from said vibration isolating base body, said rigid housing being attachable to said second body;

a partitioner disposed in said rigid housing having a first side opposing said vibration isolating body and defining a first liquid chamber therebetween and a second side opposite said first side;

a diaphragm disposed in said rigid housing opposing said second side of said partitioner and defining a second liquid chamber therebetween;

said partitioner defining at least one orifice for communicating said first liquid chamber and said second liquid chamber with each other, said at least one orifice being formed as an opening in a central portion of said partitioner extending through said partitioner in said axial direction;

said diaphragm including a valve body coaxial with said at least one orifice for moving between a first position whereat said at least one orifice is open and a second position closing said at least one orifice, said valve body in combination with said diaphragm forming an annular portion abutting a lower face of a periphery of rigid opening of said partitioner when said diaphragm is in said second position, and said valve body having a projection provided at a center of said annular portion fitting in said at least one orifice;

said annular portion and an upper face of said protrusion defining a first distance therebetween which is greater than a second distance of maximum travel of said valve body to said first position whereby said projection of said valve body remains at least partly inserted within said opening when said valve body is moved to said first position;

an actuation mechanism for moving said valve body between said first position and said second position; and said valve body having lateral deviation-preventing structure on an outer circumference of said projection, said lateral deviation-preventing structure including a plurality of parts provided at intervals in a circumferential direction of said projection and being engageable with a periphery of said at least one orifice.

3. The switchable liquid-filled vibration isolating mount according to claim 2 wherein said actuation mechanism includes a biasing member biasing said diaphragm and said valve body against said partitioner to occlude said at least one orifice.

4. A switchable liquid-filled vibration isolating mount as set forth in claim 2 wherein said valve body is adapted to protrude above said partitioner when said second position.

5. The switchable liquid-filled vibration isolating mount according to claim 2 wherein said actuation mechanism includes:

a diaphragm assembly in said rigid housing between said diaphragm and said bottom wall and defining an equilibrium chamber between said diaphragm and said diaphragm assembly and defining a switching chamber between said diaphragm assembly and said bottom wall, said diaphragm assembly being displaceable to engage said diaphragm and permit movement of said diaphragm between said first and second positions; and said switching chamber including a communication passage for selective application of an atmospheric pressure and a reduced pressure, reduced from said atmospheric pressure, to move said diaphragm assembly to a position away from said partitioner to permit said valve body to move to said first position to open said at least one orifice when said reduced pressure is applied, and to move said diaphragm assembly toward said at least one orifice to engage said valve body and move said valve body to said second position closing said at least one orifice does when said atmospheric pressure is applied.

6. The switchable liquid-filled vibration isolating mount according to claim 5 wherein said actuation mechanism further includes a biasing member biasing said diaphragm and said valve body against said partitioner to occlude said at least one orifice.

7. The switchable liquid-filled vibration isolating mount as set forth in claim 6 wherein said valve body is adapted to protrude above said partitioner when said atmospheric pressure is applied to said switching chamber.

8. The switchable liquid-filled vibration isolating mount according to claim 2 further comprising a stopper member interposed between said valve body and said bottom wall to limit travel of said valve body to said second distance of maximum travel to said first position.

9. The switchable liquid-filled vibration isolating mount according to claim 8 wherein said stopper member is disposed on said bottom wall.

10. The switchable liquid-filled vibration isolating mount according to claim 8 wherein said actuation mechanism includes:

a diaphragm assembly in said rigid housing between said diaphragm and said bottom wall and defining an equilibrium chamber between said diaphragm and said diaphragm assembly and defining a switching chamber between said diaphragm assembly and said bottom wall, said diaphragm assembly being displaceable to engage said diaphragm and permit movement of said diaphragm between said first and second positions; and said switching chamber including a communication passage for selective application of an atmospheric pressure and a reduced pressure, reduced from said atmospheric pressure, to move said diaphragm assembly to a position away from said partitioner to permit said valve body to move to said first position to open said at least one orifice when said reduced pressure is applied, and to move said diaphragm assembly toward said at least one orifice to engage said valve body and move said valve body to said second position closing said at least one orifice does when said amospheric pressure is applied.

11. A switchable liquid-filled vibration isolating mount as set forth in claim 10 wherein said valve body is adapted to protrude above said partitioner when said atmospheric pressure is applied to said switching chamber.

12. The switchable liquid-filled vibration isolating mount according to claim 10 wherein said actuation mechanism further includes a biasing member biasing said diaphragm and said valve body against said partitioner to occlude said at least one orifice.

13. A switchable liquid-filled vibration isolating mount as set forth in claim 12 wherein said valve body is adapted to protrude above said partitioner when said atmospheric pressure is applied to said switching chamber.

* * * * *